UNITED STATES PATENT OFFICE.

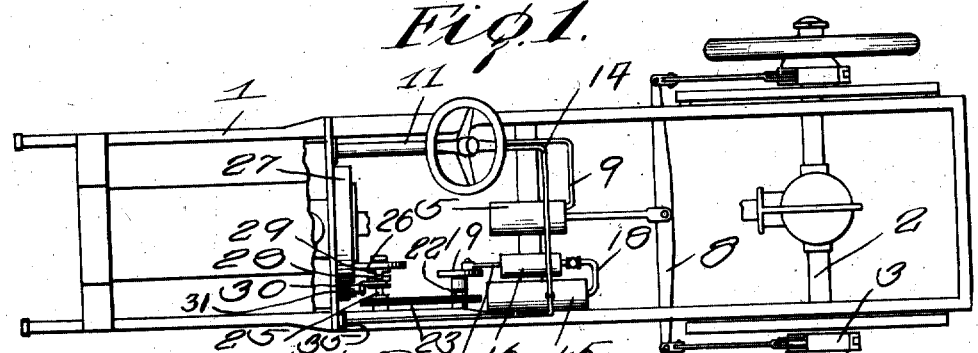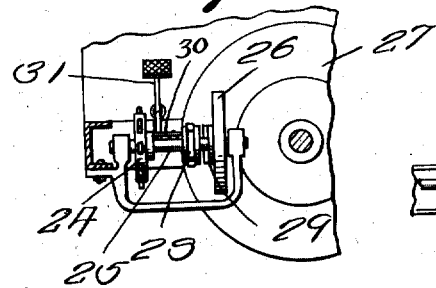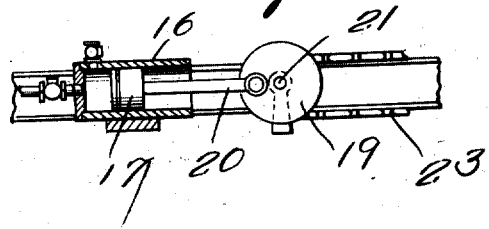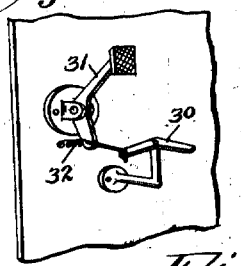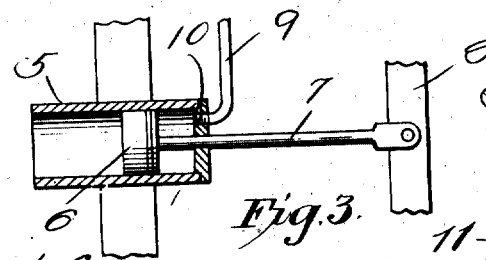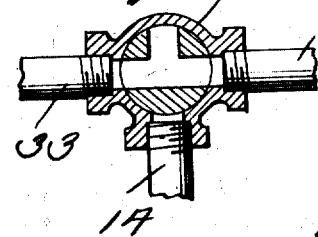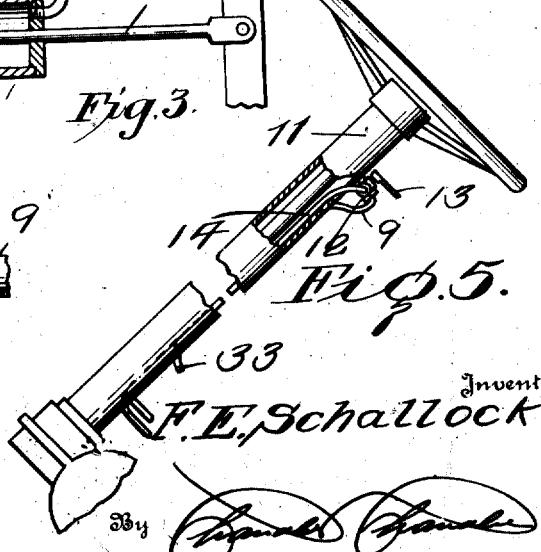

FREDRICK E. SCHALLOCK, OF SAN FRANCISCO, CALIFORNIA.

AIR-BRAKE SYSTEM.

1,250,361.    Specification of Letters Patent.    Patented Dec. 18, 1917.

Application filed April 25, 1917. Serial No. 164,531.

*To all whom it may concern:*

Be it known that I, FREDRICK E. SCHALLOCK, a citizen of the United States, residing at San Francisco, in the county of San Francisco, State of California, have invented certain new and useful Improvements in Air-Brake Systems; and I do hereby declare the following to be a full, clear, and exact description of the invention, such as will enable others skilled in the art to which it appertains to make and use the same.

This invention relates to an air brake system and is particularly adapted for use on heavy vehicles such as motor trucks.

An object of the invention is to so construct the device that it may be incorporated in a truck and attached to the ordinary band brake.

A further object of the invention is to provide for the compression of air by the drive wheel of an engine, the compression being under the direct control of the operator.

A further object of the invention is to so construct the device that it may be readily incorporated in vehicles of the types used at the present day, and its installation therein will be exceedingly simple and may be quickly accomplished.

With these and other objects in view, such as will appear as the description progresses, my invention comprises the combination and arrangement of parts as set forth in and falling within the scope of the appended claim.

Referring to the drawing:

Figure 1 is a plan view of my device applied to an automobile, only such parts of the automobile being shown as are necessary to illustrate the invention.

Fig. 2 is a sectional view of the device.

Fig. 3 is a fragmental sectional view of the brake applying cylinder.

Fig. 4 is a similar view of the pumping mechanism.

Fig. 5 is a similar view of the controlling valve showing its position on the steering rod casing.

Fig. 6 is a sectional view of the controlling valve.

Fig. 7 is a detail perspective view of the foot pedal and its connection with the shifter lever.

Referring to the drawing wherein like parts are indicated by like characters throughout the several views:—

The reference character 1 indicates the chassis of a motor truck and 2 the rear axle thereof on which are mounted brake drums 3 having the ordinary band brakes 4 thereon. It is for the application of this band brake to retard or completely stop the rotation of the rear axle 2 that my invention is designed, and in order that this brake may be effectively controlled, I have mounted on the chassis a cylinder 5 in which is operable a piston 6, the rod 7 thereof being connected by links 8 to the arm of the band brakes 4.

In order that air may be injected into the cylinder 5 and thus move the piston 6 and apply the brake 4, I have provided a pipe 9 which is connected to the cylinder 5, as at 10, and passes beneath the chassis of the truck and upwardly through the casing 11 of the steering post and is connected at its upper end to a three-way valve 12, the latter being controlled manually by a handle 13.

Connected to this valve 12 and extending downwardly within the casing 11 of the steering post is a pipe 14 which is connected at its other end to an air storage tank 15 in which air under pressure is retained. It will thus be seen that when the valve 12 is operated by the handle 13 to allow communication between the pipes 9 and 14 that air will be forced through the pipe 9 from the storage tank 15 and will move the piston 6 so that the band brake 4 will be applied to the drum 3 to frictionally engage the same and retard or prevent the rotation of the rear axle 2. It is of course to be understood that the valve 12 may be so operated that communication between the pipes 9 and 14 will be shut off and this position is illustrated in Fig. 6 of the drawing.

In order that air may be compressed in the storage tank 15 at the will of the operator, I have mounted on the chassis a cylinder 16 in which is operable a piston 17, and which cylinder 16 is connected to the storage tank 15 by a suitable pipe 18. This piston 17 is connected to an eccentric disk 19 by a rod 20, which disk is mounted on a shaft 21, the latter being rotatably mounted in suitable bearings supported by the chassis. On the other end of this shaft 21 is a sprocket 22 over which a chain 23 passes and by means of which chain the sprocket 22 is rotated and consequently the piston 17 reciprocated in the cylinder 16 to compress the air in the storage tank 15, this chain 23 passes over a sprocket 24 mounted fixedly on a shaft 25. In order that this sprocket 24 may be driven at the will of the operator, I have loosely mounted on the shaft 25 a friction wheel 26, the periphery of which wheel engages the rear face of the drive wheel 27 of the engine, but which wheel normally rotates independently of the shaft 25, however, in order that this friction wheel 26 may be clutched to the sprocket 24, I have provided a suitable clutch member 28 on the sprocket 24, and a clutch member 29 on the wheel 26 so that the said wheel may be clutched to the sprocket and because of its frictional engagement with the drive wheel 27 rotates the said sprocket and actuates the piston 17. In order that the wheel may be clutched to the sprocket 24, I have provided a shipper lever 30 which is operatively connected with a pedal 31 within reach of the operator. This wheel 26 is normally held out of coöperative relation with the sprocket 24 by a spring 32 connected to the pedal 31.

Extending from the three-way valve 12 is an exhaust pipe 33 between which pipe communication may be had through the said valve 12 so that when it is desired to allow the air to escape from the cylinder 5 to release the brakes, the valve 12 may be so turned as to allow communication between the pipes 9 and 33 and thus the air will be exhausted from the cylinder 5 and the brakes released.

The storage tank 15 is provided with a gage 35 within the observation of the operator.

In operation the pedal 31 is pushed downwardly against the action of the spring 32, that is, after the engine has started and the clutch members 28 and 29 interengaged, at which time the piston 17 is reciprocated and air stored in the tank 15, at this time the pipes 9 and 33 are in communication and the pipe 14 closed. When the pressure indicated on the gage 35 reaches the desired point, the pedal 31 is released and while the friction wheel 26 continues its rotation, the pumping action is stopped because of the disengagement of the clutch members 28 and 29 caused by the spring 32. When it is desired to apply the brakes the operator moves the handle 13 to allow communication between the pipes 9 and 14 at which time air is injected into the cylinder 5 and the brakes 4 applied.

From the foregoing description it will be readily seen that I have provided an exceedingly simple and efficient air brake system particularly adapted for use in motor trucks, and I have so constructed the device that air pressure may be maintained at an even point at the will of the operator. I have further provided a device which may be incorporated in any of the present day trucks and connected to the band brakes now used.

While I have illustrated and described a particular embodiment of my invention, I have merely done so for the sake of convenience and I do not wish to be limited to that particular embodiment as it is obvious that numerous changes may be made in the details of construction thereof without in any way departing from the spirit of the invention or without exceeding the scope of the appended claim.

What I claim is:

In combination with a motor truck having a band brake on the rear axle thereof, a cylinder, a piston operable in said cylinder and operatively connected to said band brake, a storage tank, means for controlling the injection of air into the said cylinder from the storage tank, means for compressing air in the said storage tank comprising a cylinder, a pipe connecting the cylinder to the storage tank, a piston operable in the cylinder and having a rod thereon, a disk rotatably mounted on the chassis of the truck, the said rod being eccentrically connected to the said disk, a friction wheel mounted on the chassis and bearing against the drive wheel of the engine, a plurality of sprockets, a chain passing over said sprockets, the said sprockets being constructed and arranged to connect the said friction wheel and the said disk, means to clutch the said friction wheel to one of said sprockets and automatic means to render said clutching means inoperative.

In testimony whereof, I affix my signature, in the presence of two witnesses.

FREDRICK E. SCHALLOCK.

Witnesses:
WM. J. SCHALLOCK,
JOHN E. JOHNSON.